F. M. MULLINS.
FASTENER.
APPLICATION FILED AUG. 31, 1920.
1,374,025.
Patented Apr. 5, 1921.
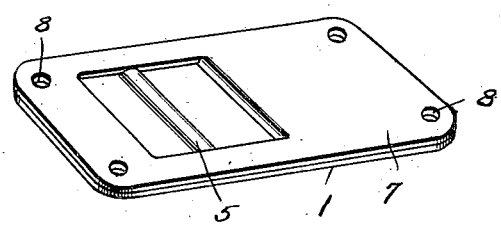
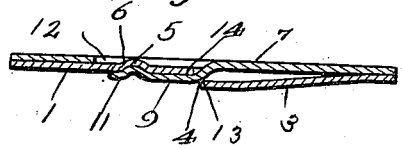
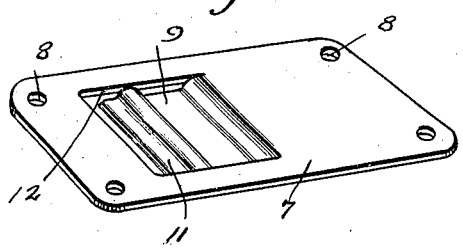
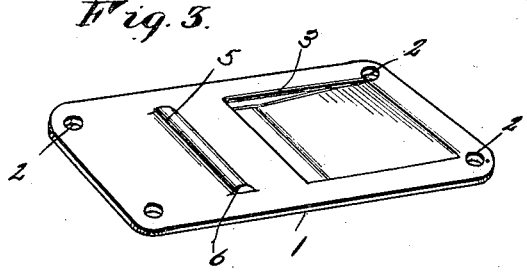
F. M. Mullins
INVENTOR

UNITED STATES PATENT OFFICE.

FRANK M. MULLINS, OF HAVELOCK, NEW BRUNSWICK, CANADA.

FASTENER.

1,374,025.　　　　　Specification of Letters Patent.　　Patented Apr. 5, 1921.

Application filed August 31, 1920. Serial No. 407,284.

*To all whom it may concern:*

Be it known that I, FRANK M. MULLINS, a subject of the King of England, residing at Havelock, in the county of Kings, in the Province of New Brunswick and Dominion of Canada, have invented new and useful Improvements in Fasteners, of which the following is a specification.

My present invention has reference to a garment fastener.

The object is the provision of a fastener in the nature of a hook and eye, in which both of the elements are in the nature of flat members which offer only a slight protrusion when secured to the garments, and which coengage in such a manner as to positively prevent the accidental separation thereof.

A further object is the provision of a garment fastener constituting two flat plates one in the nature of an eye which is grooved or channeled from one of its ends to an opening therein and the portion thereof directly opposite or to the rear of the opening formed with a shoulder, the plate of the hook member being slotted to provide the hook therefor, the said hook depending from the body and designed to be passed through the channel of the body of the eye member to contact with the inner wall provided by the slot therein, and the inner wall of the opening made in the production of the hook designed to contact with the projection on the body of the eye member, thus the hook member engages with the eye member at two separate and distinct points whereby accidental movement of the hook member over the eye member in a longitudinal direction will be prevented, and the engagement of the hook in the channeled portion of the eye also preventing lateral movement of the hook member with respect to the eye member.

The drawings illustrate a satisfactory embodiment of the improvement reduced to practice, and in which:

Figure 1 is a perspective view illustrating the members assembled.

Fig. 2 is an approximately central vertical sectional view therethrough, on an enlarged scale.

Fig. 3 is a perspective view of the eye member.

Fig. 4 is a similar view of the hook member.

Both of the elements constituting my improved fastener are formed from comparatively small substantially rectangular preferably metallic plates, and each may be of a similar size.

For the sake of distinction I will refer to one of the elements as the eye member, and to the other as the hook member.

The eye member is broadly indicated by the numeral 1, and the body plate thereof at its corners has openings 2 therethrough for the passage of the securing threads. The body plate 1, from what I will term its inner edge is centrally depressed longitudinally for a determined distance, as indicated by the numeral 3, and the inner wall of the said depression being arranged at an inward and downward angle and terminates in a transverse slot or opening 4. The portion of the body, directly opposite or to the rear of the slot 4 is slightly bulged outwardly, as at 5, to provide the rear end thereof with a shoulder 6. The shoulder 6 is of a width equaling that of the depression or passage 3, and consequently does not extend the entire width of the body plate 1. The hook member is broadly indicated by the numeral 7. The body plate, constituting the same has its corners provided with openings 8 for the passage of the securing threads. The body plate, from a point adjacent to the outer end thereof is slitted transversely and longitudinally, and the metal bounded by the slit is bent to provide a tongue 9 which is arranged a slight distance below the plane of the outer face of the body, the said tongue terminating in a downturned lip 11. The tongue is of a width corresponding to that of the passage 3 in the body plate of the eye member 1, and the inner wall provided by the transverse slit in the formation of the tongue, is for distinction indicated by the numeral 12.

By reference to Fig. 2 of the drawings, it will be seen that when the hook member is brought to engagement with the eye member the tongue 9 will be received in the depression or passage 3, the lip 11 passes through the slot 4 in the body plate of the eye member and contacts with the shoulder 13 which provides the inner wall of the said slot. The lip portion of the tongue is also engaged by the inner wall 14 of the bulged portion 5 of the body plate of the eye, and the wall 12 of the body plate of the hook is brought into contacting engagement with the shoulder 6 in the body plate of the eye member 1. Thus it will be noted that the hook member is snugly received in the depression 3 of the element 1 so that lateral movement of the hook member with respect to the eye member will be prevented. It will be further seen that the downturned tongue on the end of the hook is in contacting engagement with the wall 13 provided by the slot 4, the upper portion of the tongue is contacted by the inner wall 14 of the bulged portion 5, and the wall or shoulder 12 of the hook member contacts with the shoulder 6 provided by the bulged portion of the eye member. Thus it will be noted that both lateral and accidental longitudinal displacement of the fastening elements will be effectively prevented, and it is believed that the foregoing description, when taken in connection with the drawings will fully set forth the simplicity and advantages of the improvement without further detail description, it being thought merely necessary to state that the flat construction of the fasteners prevent any bulging of the portion of the garment to which they are secured, and also that the edges of the said elements may be rounded so that no injury can be inflicted to the said garments.

Having thus described the invention, what I claim, is:—

In a garment fastener, two flat substantially rectangular plates having openings at the corners thereof, one of said plates having a central longitudinal downwardly inclined depressed portion which terminates with a slot which is arranged transversely of the said plate, the portion of the plate inward of the slot being bulged upwardly and the said bulged portion having its outer edge provided with a shoulder, the second plate being slitted transversely and longitudinally and the metal bounded by the slit bent to provide a tongue that terminates in a downturned lip, and said tongue being arranged below the outer surface of the said plate, said tongue being of a width corresponding to that of the depression in the first mentioned plate and designed to be received therein and to have its lip contact with the inner wall of the slot and to be contacted by the inner wall of the bulged portion of the first mentioned plate, and the wall provided by the transverse slot in the second mentioned plate designed to contact with the shoulder of the bulged portion of the first mentioned plate, when the plates are associated.

In testimony whereof I affix my signature.

FRANK M. MULLINS.